Aug. 15, 1950  W. K. ANDERSON  2,518,851
GROMMET
Filed May 22, 1945

INVENTOR.
WARREN K. ANDERSON
BY Edwin Coates
ATTORNEY

UNITED STATES PATENT OFFICE 2,518,851

GROMMET

Warren K. Anderson, Pacific Palisades, Calif., assignor to Douglas Aircraft Company, Inc., Santa Monica, Calif.

Application May 22, 1945, Serial No. 595,159

4 Claims. (Cl. 16—2)

This invention relates to grommets, particularly those adapted to be inserted in an aperture formed in a bulkhead or the like for passing a conduit therethrough. The purpose of this type of grommet is to protect such conduits as are susceptible to abrasion or wear, from frictional contact with the sharp or relatively thin edge of the aperture.

Grommets heretofore proposed for this purpose comprise a ring split on one side of its axis of revolution by a plane of cleavage extending directly towards the center of the ring along a radius of the ring. When the grommet is contracted radially to insert it into the aperture or to remove it therefrom, the ends of the split grommet invariably overlap circumferentially and bind radially against each other, preventing direct radial expansion of the ring. To expand such a grommet into its aperture thus necessitates the application of pressure to the adjacent ends of the grommet in opposite directions circumferentially of the grommet; that is, the ring has to be pulled somewhat apart. This characteristic of such grommets renders the seating or application of the grommet comparatively difficult and rather time wasting for an operation of relatively minor importance.

The present invention provides a grommet which can be quite easily inserted in an aperture in a bulkhead or the like and which locks itself in place therein without requiring any of the aforementioned circumferential stretching manipulations. It can be equally easily unlocked and removed from the bulkhead. The grommet is installed and removed without requiring the employment of any sort of tool whatever.

In its usual embodiment, the grommet is split at one side by a plane of cleavage that is inclined with reference to the axis of revolution and angularly displaced with reference to a diametral line passing through the point of intersection of the cleavage plane with the periphery of the ring. An end of the ring can hence be compressed inwardly of the ring, along a spiral path, while the other end is anchored against the periphery of the aperture. The ring in this contracted condition can then be inserted coaxially in the aperture with its periphery in engagement with the periphery of the aperture.

Upon substantial completion of the peripheral interengagement, the other end of the ring then snaps into abutment with the anchored end, moving outwardly in a spiral, or non-radial direction to do so. The expansive tendency of the ring securely holds the so disposed ring in place against the periphery of the aperture. In order to further secure the grommet in place against displacement by unusually violent forces, its periphery may be provided with means, such as an annular groove, for positively interengaging with the periphery of the aperture.

To remove the grommet, it is only necessary to compress one end inwardly, away from engagement with the periphery of the aperture, the end moving along a spiral pathway, the fingers at the same time urging the end slightly outwardly of the plane of the ring. The remainder of the ring then easily disengages itself from the periphery of the aperture, due to the inward contraction transmitted around the periphery, coupled with the outward pull on the free end of the ring.

The surfaces of the ends of the ring are rendered planar and parallel with reference to each other by the dual inclination of the plane of cleavage, so that, either in installing or removing the grommet, these surfaces move in parallelism along their non-radial paths. Since the free end of the ring, in contracting or expanding it, moves along a line extending at an angle to the diameter of the ring passing through the intersection of the cleavage plane with the periphery, at no position in its movement does it overlap or lie directly or radially behind the other end of the ring. It is thus impossible for these ends to assume a position in which one end can bind radially against the other. Hence, it is unnecessary to circumferentially separate the ends, or pull the ring apart, as in the prior types of split grommets, in order to fit the grommet into place in the aperture.

Preferably, the grommet is formed of some comparatively stiff and shape-retaining material, and it is also desirable that this material be of such a composition as to have a certain amount of resiliency despite its shape-retaining nature. This resiliency enables the ring to be more easily fitted into position in the aperture or to be removed therefrom, and facilitates its snapping into self-locking engagement with the wall of the aperture.

The other concepts and accomplishments of the invention will become manifest as this specification proceeds.

One of the presently preferred embodiments of the inventive concepts is illustrated, by way of example only, in the accompanying drawings and described hereinafter with reference to said drawings. It is to be understood, however, that the invention is limited in the embodiments which it can take only by the scope of the accompanying claims.

In these drawings.

Figure 1:
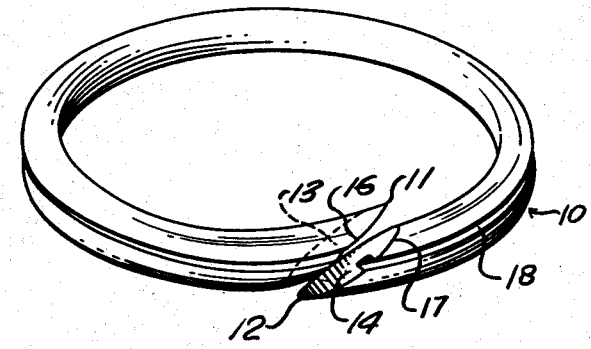
Figure 1 is a perspective view of the grommet.
Figure 2:
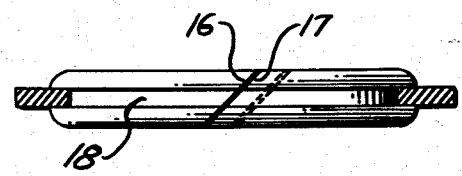
Figure 2 is a side view of the grommet mounted in a bulkhead, showing the latter in section.
Figure 3:
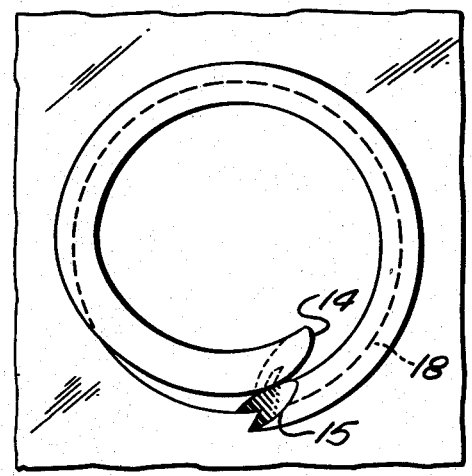
Figure 3 is a plan view of the grommet showing the same partially installed in an aperture in a bulkhead.

Referring now more in detail to the drawings, the grommet of the present invention comprises a toroidal or ring-like member 10. Although the member 10 is shown as a torus having a substantially oval cross-section, it is to be understood that the grommet may have a cross-section of any shape desired. The ring is discontinuous; that is, it is split at one side by a plane of cleavage forming two adjacent ends, 11 and 12, on the ring.

The plane of cleavage is inclined with respect to the axis of revolution, and hence defines plane surfaces 13 and 14 on these ends which, when extended inwardly of the ring, intersect the axis of revolution of the ring at a point lying outside the ring. The point of intersection also lies either below or above the major plane of the ring, depending upon whether the plane of cleavage slants to the right, as in the drawings, or to the left. The plane of cleavage is also angularly displaced with reference to a diametral line passing through the point of intersection of the cleavage plane with the periphery. The cleavage plane hence intersects the upper and lower faces of the ring along non-radial lines 14 and 15, and, due to its inclination with respect to the axis of revolution, intersects the inner and outer faces of the ring along diagonal lines 16 and 17.

Preferably, but not necessarily, each of the aforementioned angles of inclination is of the order of 45° with reference to the respective datum lines mentioned, as it has been found that the employment of this particular angle facilitates the mounting and removal of the ring.

It is not absolutely essential that the plane of cleavage be inclined with reference to the axis of revolution, however, so long as it is angularly displaced with reference to the diametral line passing through the point of intersection of the cleavage plane with the periphery of the ring.

Due to this construction of the ring, one end thereof may be anchored or held in engagement with the wall of an aperture and prevented from moving, while the opposite end is contracted in a roughly spiral path to a position inwardly of the anchored end. This feature of construction greatly facilitates the mounting or removal of the grommet with respect to the aperture it is to fair, as will be made manifest hereinafter.

The member 10 is provided with a medial peripheral groove 18 which receives the edge of the circular aperture when the ring is snapped into place therein. In order to facilitate this snap action, the member 10 is preferably constituted of a plastic which, although relatively stiff and shape-retaining in its nature, nonetheless also has sufficient resiliency to permit the member 10 to be contracted or expanded and to yield slightly under axially opposite pressures, thereby permitting the ring to be contracted for insertion into and removal from the aperture. It also permits the ends 11 and 12 to be abutted to expand the ring and effect a self-locking action of the ring in the aperture.

Due to the non-radial direction of the plane of cleavage, when an end of the ring is inwardly compressed, preparatory to inserting the grommet in the aperture, its planar face will move inwardly along a non-radial line. This line extends in substantial continuation of the plane of cleavage, and lies at an angle to the diameter of the ring at that point of its periphery that is intersected by the plane of cleavage. The line usually constitutes a portion of a spiral or a secant that is less than a diameter. Consequently, either when contracting or expanding the grommet, the planar faces 13 and 14 remain in parallelism, so that they can always slide inwardly and outwardly, in contact with each other without overlapping. Therefore, one end of the ring cannot assume a radially offset position with respect to the other. Hence no radial engagement or interference of radially squared-off ends, as in the prior grommets, and set up by circumferential overlap, can occur.

In mounting the grommet, as in an aperture in a bulkhead, one end portion thereof is pressed spirally inwardly of the ring, the extremity of this portion being constrained to move along a line extending at an angle to the diameter of the ring that meets the periphery where the plane of cleavage also intersects the periphery. The ring, in this condition, is then inserted coaxially in the aperture with the periphery of the inwardly compressed end portion in engagement with one portion of the periphery of the aperture. The remainder of the periphery of the ring is then fitted into engagement with the rest of the periphery of the aperture until the unanchored end of the ring is in juxtaposition with the first end, whereupon the unanchored end snaps into abutment with the anchored end, moving spirally outwardly on a non-radial line into engagement with the periphery of the aperture. Usually, but not necessarily, the parallel faces of these ends move in contact with each other, the sliding being facilitated by the low coefficient of friction of the material as well as by the dual inclination of each face. The resilient grommet is thus easily fitted into place with its periphery firmly engaging all around the periphery of the aperture, and its tendency to expand secures it against the periphery of the aperture.

In order to remove the grommet, one end is compressed inwardly, moving along a spiral path, and being at the same time urged by hand slightly out of the plane of the bulkhead. The remainder of the periphery of the ring then easily disengages itself from engagement with the periphery of the aperture, this disengagement being facilitated, if desired, by pulling outwardly on the free end while maintaining the inward compression thereof.

When the grommet is fully positioned in the aperture in the bulkhead, with the edge of the aperture fully entering the groove 18 all around the periphery of the grommet, the outwardly acting inherent spring action or resiliency of the ring 10, due to its shape and composition, will cause the grommet to tightly maintain itself in position, under all but the most violent forces, and this action is aided by the tendency of the inwardly offset extremities 11 and 12 to spring back to their initial positions. The positive interengagement of the lips of the groove 18 with the periphery of the aperture prevents axial displacement of the ring by axially directed forces.

It is to be understood that the grommet is to be inserted or removed from its self-locking engagement in the aperture, solely by the use of the fingers applied thereto as aforedescribed, no tool of any nature whatever being required to insert or remove the grommet. The shape and nature of the surface of the grommet are such as to set up little or no friction between the grommet and a rubber-covered, or other wire, or conduit, passing through the same. Due to the toroidal shape and to the low coefficient of friction of the material, the movement of a movable cable through the aperture is facilitated to a substantial degree, without danger of abrasion, by the presence of the grommet as compared to the movement of a movable cable through an aperture not provided with the grommet. Although the grommet is relatively easy to seat in engagement with the edge defining the aperture, and equally as easy to remove from its seated engagement and from the aperture, the self-locking feature, coupled with the resiliency and shape of the ring, provide secure and permanent anchorage of the ring in the desired position until directed forces are positively applied and the ring is positively and deliberately manipulated with an intent to remove it. There is little danger, therefore, of accidental displacement of the ring from the aperture so that conduits can be moved back and forth with considerable violence in contact with the grommet without liability of their eventually working the grommet out and becoming abraded and disintegrated by the sharp edge of the aperture.

The grommets of this invention are well adapted for manufacture on the large-quantity scale. A material of a composition capable of conferring a shape-retaining, but resilient character upon the grommet, such as one of the thermo-plastics in the plastic phase, may be molded or stamped into a plurality of the articles. Or, if desired, an extrusion of this material may be formed into a continuous helix having any desired cross-sectional shape. While still somewhat plastic, each of the convolutions of the helix, at corresponding points along the length of the helix, is severed with a suitably constructed gangshear or the like. The blades of this shear are set at such an angle with reference to the convolutions of the helix as to simultaneously divide all the convolutions along a plane of cleavage that is angularly displaced, in each convolution, with reference to that diametral line of the convolution that intersects the periphery of the convolution. The helix is thus simultaneously separated into a plurality of split, toroidal bodies, each having abutting ends with planar faces, each of these faces lying in a plane angularly offset, as above described, with reference to the aforementioned diameter and axis of revolution.

Various refinements and ramifications of the particular structural parts and shapes illustrated in the drawings are contemplated by the invention, and all lie within the scope of the subjoined claims.

I claim:

1. A grommet constructed to be axially inserted in and removed from an aperture in a partition which is laterally inaccessible and axially accessible from the one face only, comprising: a ring divided along a plane of cleavage at one side of the axis of revolution, the plane of cleavage being inclined to the axis of revolution and being displaced at an acute angle from the diametral line extending from said axis to the point of the periphery where the plane of cleavage intersects the periphery, said ring being composed of comparatively stiff, shape-retaining material having sufficient resiliency to permit the ends of the ring to be expanded and contracted towards and away from said axis, said ring having an outer peripheral groove, one of the portions of the ring adjacent the plane of cleavage being movable along a spiral path to enable the ring to be axially inserted into an aperture and thereafter to radially expand into interengagement with the periphery of the aperture whereby the grommet may be engaged with the periphery of said aperture with the fingers of one hand and independently of applicator tools without overlapping, jamming or binding of said ends.

2. A grommet constructed for axial insertion and radial expansion into an aperture in a planar partition, comprising: a generally circular, discontinuous, ring of comparatively stiff, shape-retaining material having sufficient resiliency to permit the ends of the ring to be contracted and expanded toward and away from the axis of revolution thereof; said ring having an outer peripheral groove for interengagement with the wall of said aperture; the ends of said ring having substantially planar faces confronting each other along a plane of cleavage which intersects the axis of revolution of said ring at a point lying outside of the major plane of said ring; whereby said ends may be serially moved into mounted position in said aperture without mutual interference to provide a minimum gap in said ring when fully expanded into position.

3. A grommet constructed for axial insertion and radial expansion into an aperture in a planar partition, comprising: a generally circular ring divided at one point in its circumference to provide a pair of ends having substantially planar faces confronting each other along a plane of cleavage; said ring being formed of comparatively stiff, shape-retaining material having sufficient resiliency to permit the ends to be contracted and expanded toward and away from the axis of revolution of said ring, and having an outer peripheral surface formed for interengagement with the wall of said aperture; said plane of cleavage being displaced at an acute angle from the diametral line extending from the axis of revolution to the point of the circumference where the plane of cleavage intersects the circumference; whereby a first end, the intermediate portion, and a second end of said ring may be serially moved into mounted position in said aperture without mutual interference, with said second end in its final stage moving substantially in said plane of cleavage.

4. A grommet constructed for axial insertion and radial expansion into an aperture in a planar partition, comprising: a generally circular ring divided at one point in its circumference to provide a pair of ends having substantially planar faces confronting each other along a plane of cleavage; said ring being formed of comparatively stiff, shape-retaining material having sufficient resiliency to permit the ends to be contracted and expanded toward and away from the axis of revolution of said ring, and having an outer peripheral surface formed for interengagement with the wall of said aperture; said plane of cleavage being displaced at an acute angle from the diametral line extending from the axis of revolution to the point of the circumference where the plane of cleavage intersects the circumference, and intersecting said axis of revolution at a point lying outside of the major plane of said ring; whereby a first end, the intermediate portion, and a second end of said ring may be serially moved into mounted position in said aperture without mutual interference to provide a minimum gap in said ring when fully expanded into position.

WARREN K. ANDERSON.

REFERENCES CITED

The following references are of record in the file of this patent:

UNITED STATES PATENTS

| Number | Name | Date |
|---|---|---|
| 205,165 | Woodruff | June 18, 1878 |
| 664,143 | Garlock | Dec. 18, 1900 |
| 898,786 | Saunders | Sept. 15, 1908 |
| 1,084,281 | King | Jan. 13, 1914 |
| 1,415,632 | Gurke | May 9, 1922 |
| 1,697,814 | Forbes | Jan. 1, 1929 |
| 1,873,859 | Bailey | Aug. 23, 1932 |
| 2,355,126 | Webster et al. | Aug. 8, 1944 |
| 2,367,836 | Brown | Jan. 23, 1945 |